United States Patent [19]

Roller

[11] 3,951,753
[45] Apr. 20, 1976

[54] METHOD AND APPARATUS FOR THE CONVERSION OF AN AQUEOUS SCALE-FORMED LIQUID

[76] Inventor: Paul S. Roller, 703 Colorado Bldg., 131 G St., NW., Washington, D.C. 20005

[22] Filed: Feb. 22, 1974

[21] Appl. No.: 444,789

Related U.S. Application Data

[63] Continuation of Ser. No. 834,203, June 3, 1969, abandoned, which is a continuation-in-part of Ser. No. 531,278, March 15, 1966, abandoned.

[52] U.S. Cl. .................................. 203/7; 203/26; 203/11; 202/174
[51] Int. Cl.² ...................... B01D 5/00; C02B 1/06
[58] Field of Search .................. 203/6, 7, 10, 11, 1, 203/100, 24, 26; 202/160, 174, 173, 181; 23/301, 300; 210/56; 423/165, 637

[56] References Cited
UNITED STATES PATENTS

| | | | |
|---|---|---|---|
| 1,489,009 | 4/1924 | Rohmer et al. | 203/24 |
| 2,979,442 | 4/1961 | Badger | 203/7 |
| 3,026,261 | 3/1962 | Mayfield et al. | 210/56 |
| 3,119,752 | 1/1964 | Checkovich | 203/11 |
| 3,298,931 | 1/1967 | Herbert et al. | 159/16 S |
| 3,326,778 | 6/1967 | Mock | 202/234 |
| 3,388,045 | 6/1968 | Goeldner et al. | 203/11 |
| 3,420,775 | 1/1969 | Cadwallader | 203/10 |
| 3,463,814 | 8/1969 | Blanco et al. | 203/7 |
| 3,525,675 | 8/1970 | Gaudin | 203/7 |
| 3,692,634 | 9/1972 | Othmer | 203/7 |

*Primary Examiner*—Norman Yudkoff
*Assistant Examiner*—Frank Sever

[57] ABSTRACT

Saline water is preheated by the hot discharges of a vapor compression evaporator, forming distillate and concentrated brine. Carbon dioxide that has been recycled to saline water prevents alkaline scale during the preheat. The saline water is thence further heated by steam which is condensed in it; scale compounds are precipitated and carbon dioxide formed and expelled for recycle. Mother liquor which is separated is flash vaporized, forming cooled mother liquor and vapor. The mother liquor is further cooled while preheating saline water, and is then evporated. The vapor is compressed to form steam for use in the further heating.

18 Claims, 11 Drawing Figures

INVENTOR
Paul S. Roller

METHOD AND APPARATUS FOR THE CONVERSION OF AN AQUEOUS SCALE-FORMED LIQUID

This application is a continuation of my former application, Ser. No. 834,203, filed June 3, 1969, which was a continuation-in-part of my former application, Ser. No. 531,278, filed Mar. 15, 1966, both now abandoned.

The invention relates to converting an aqueous scale-forming liquid to distillate and liquid residuum, and in particular to processing the liquid to avoid scale and minimize corrosion while evaporating it to a high degree.

An aqueous scale-forming liquid is characterized by the presence of dissolved scale-forming compounds comprising chiefly the alkaline scale-forming compounds of calcium and magnesium bicarbonates and carbonates and the non-alkaline scale-forming compounds of calcium sulfate. It is characterized also by the presence of corrosion-inducing gases, including carbon dioxide derived from the thermal decomposition of bicarbonates and carbontes and usually also oxygen derived from air present in the liquid. The prevention of scale and corrosion in the context of the invention relates to these major constituents. It will be recognized that in overcoming them, minor detrimental ones of a similar kind, relating, for example, to precipitable compounds of iron and silica, will be similarly overcome; and no further comment will be made herein concerning these.

Sea water is typical of the aqueous scale-forming and corrosive liquids under consideration; others include brackish, estuarine and varied saline waters, and industrial liquids to be evaporated, such as black liquor in kraft paper making. Sea or ocean water is foremost of the scale-forming liquids; accordingly, it is taken for exemplification when fitting to the subject matter of the disclosure, although the broader scope of the invention is to be understood.

Considering briefly those attributes that relate to scale formation and corrosion, sea water has a salinity of 3.5 % and a sodium chloride content of 2.5 %. In direct evaporation, calcium carbonate begins to deposit as scale at approximately 140°F, magnesium hydroxide at 170°F and calcium sulfate at 190°F.

The degree of evaporation is expressed by a concentration factor, defined as the ratio of concentration of a fixed constituent, such as chlorine ion, in evaporated liquid to that in the original liquid. It is desirable to achieve in evaporation a high concentration factor since this signifies a correspondingly low cost of equipment and operation. In the instance of sea water, the concentration factor in evaporating the saturation with sodium chloride is approximately nine.

The formation of scale in sea water evaporation is an important topic of continuing interest. Several methods of scale prevention are presently in use or under consideration. A current, widely practiced method comprises acidifying the sea water to complete decomposition of alkaline scale-forming compounds. A method that has been under long consideration comprises adding scale seeds, derived usually from evaporator blowdown, to evaporating brine. In the presence of such seeds, crystallization of scale compounds tends to occur in the body of the evaporating liquid instead of as scale on the surfaces of an evaporator.

A method analogous to that of adding seeds comprises adding a nucleating agent to the scale-forming liquid. The nucleating agent is of a composition different from that of scale compound, but it is also capable, nevertheless, of effecting body crystallization. Various minerals and other substances have been experimented with for this purpose. Examples of an effective nucleating agent are ferric chloride and ferric hydroxide, the latter obtainable by electrolysis employing iron anodes. Although the action of ferric chloride has been often ascribed to the acid formed in hydrolysis, it is believed more likely to the due to the ferric hydroxide simultaneously obtained. With the addition of either material, scale prevention has been achieved to a substantial degree in evaporating sea water.

It will be recognized that, besides inclining to corrosion, the utilization of acid is limited in scope, since it does not affect calcium sulfate. This compound preponderates in sea water to the extent of more than ten-fold over the alkaline compounds expressed as calcium carbonate. Its inevitable scaling of a particularly adherent kind has consistently frustrated attempts to improve upon the art of sea water desalination by evaporation.

The addition of scale seeds or of nucleating agent is more generally applicable than that of acid. However, involving as it does internal treatment, when applied to an evaporator the method is sibject to vicissitudes occasioned by vaporization, condensation, increases in concentration and changes of temperature. The internal treatment has, accordingly been uncertain and limited when applied as a sole corrective in evaporation.

The prevailing, current practice in desalination is that of multistage flash evaporation coupled to acid treatment of the sea water. In view of the limited heat available in self-cooling, multistage flash evaporation has the draw-back of an inescapably low concentration factor. The classical methods of vapor compression evaporation and multiple effect evaporation, on the other hand, are capable of a concentration factor that is theoretically limitless. However, since they involve surface evaporation, these methods are relatively susceptible to scale formation and have therefore become virtually excluded from desalination practice.

The present invention is based upon novel, external treatment of a scale-forming liquid, such as sea water, to provide a processed liquid that, deprived of deleterious constituents, may be evaporated to a high concentration factor, scale-free and free of corrosion due to carbon dioxide and oxygen.

It is, accordingly, a principal object of the invention to provide for a high concentration factor in the evaporation of a scale-forming liquid by antecedent, thermal precipitation of scale-forming compounds therein in the presence of condensing steam.

Another object is to provide for reduction of corrosion in evaporation by eliminating carbon dioxide and oxygen during the thermal precipitation.

Still another object is to provide for economy of processing by recovering the steam and recycling it to the theraml precipitation.

A further object is to provide for low cost by avoiding the employment of foreign agent except as discretionary alternatives.

A still further object is to provide for improved vapor compression evaporation of liquid formed in the process by taking into account the material boiling point elevation occurring at high concentration factors.

With these and other objects in mind, as will become more apparent from consideration of the detailed description which follows, reference is made to the drawing, in which.

In the Figures like parts are identified by the same or like numerals. Arrows inscribed on the conduit lines indicate the direction of fluid flow. The letter T represents fluid temperature; the numerical subscript to T expresses the relative magnitude of the temperature, thus $T_7$ indicates a higher temperature than $T_5$. Temperatures are assumed to be those at equilibrium, omitting consideration of differentials due to thermal lag, since these are of no material consequence to the invention.

Figure 1A:
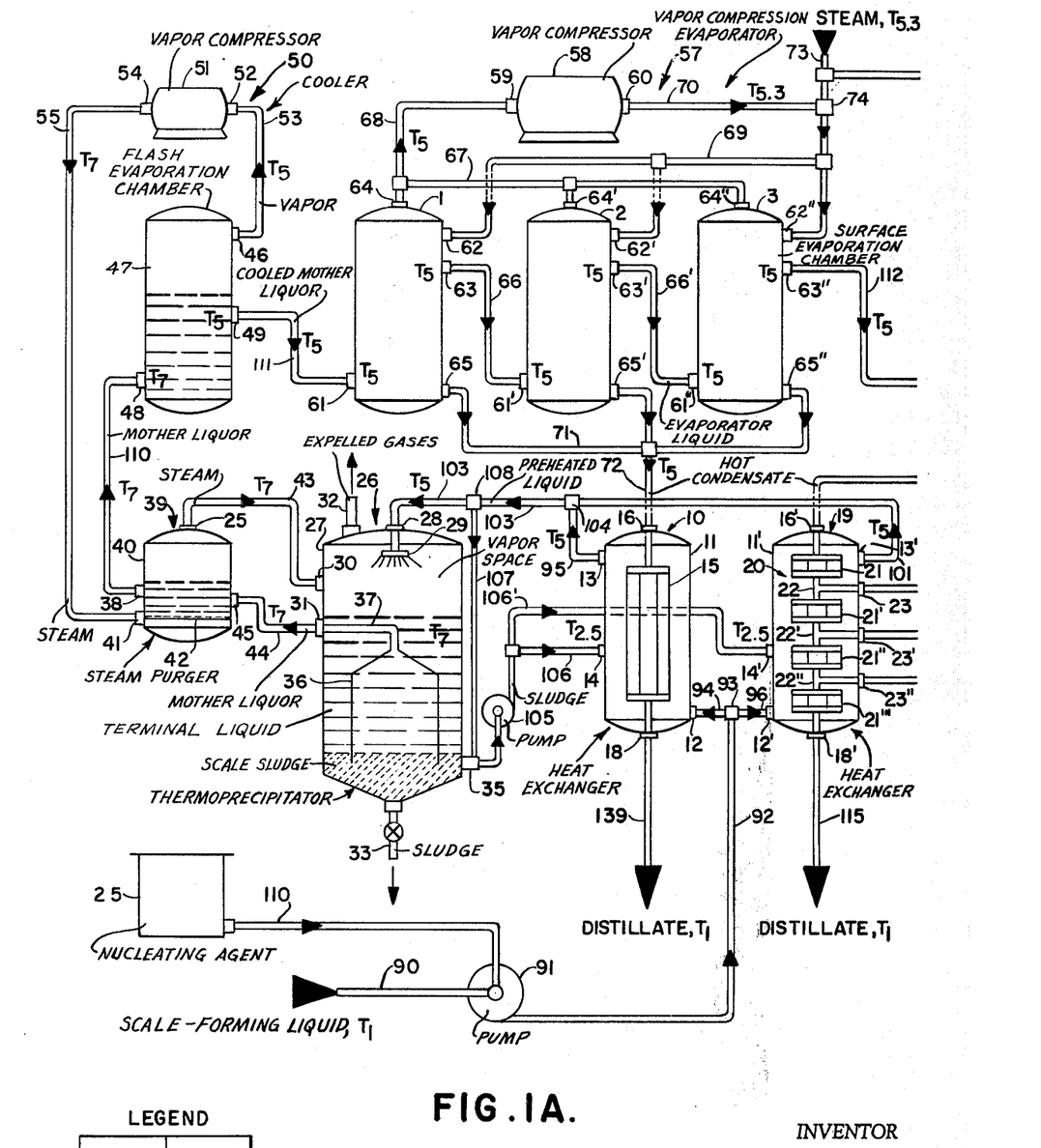
FIG. 1A and 1B, comprising two parts of a single figure, are a diagrammatic representation of an apparatus according to the invention.
Figures 1B, 2, 3, 4:
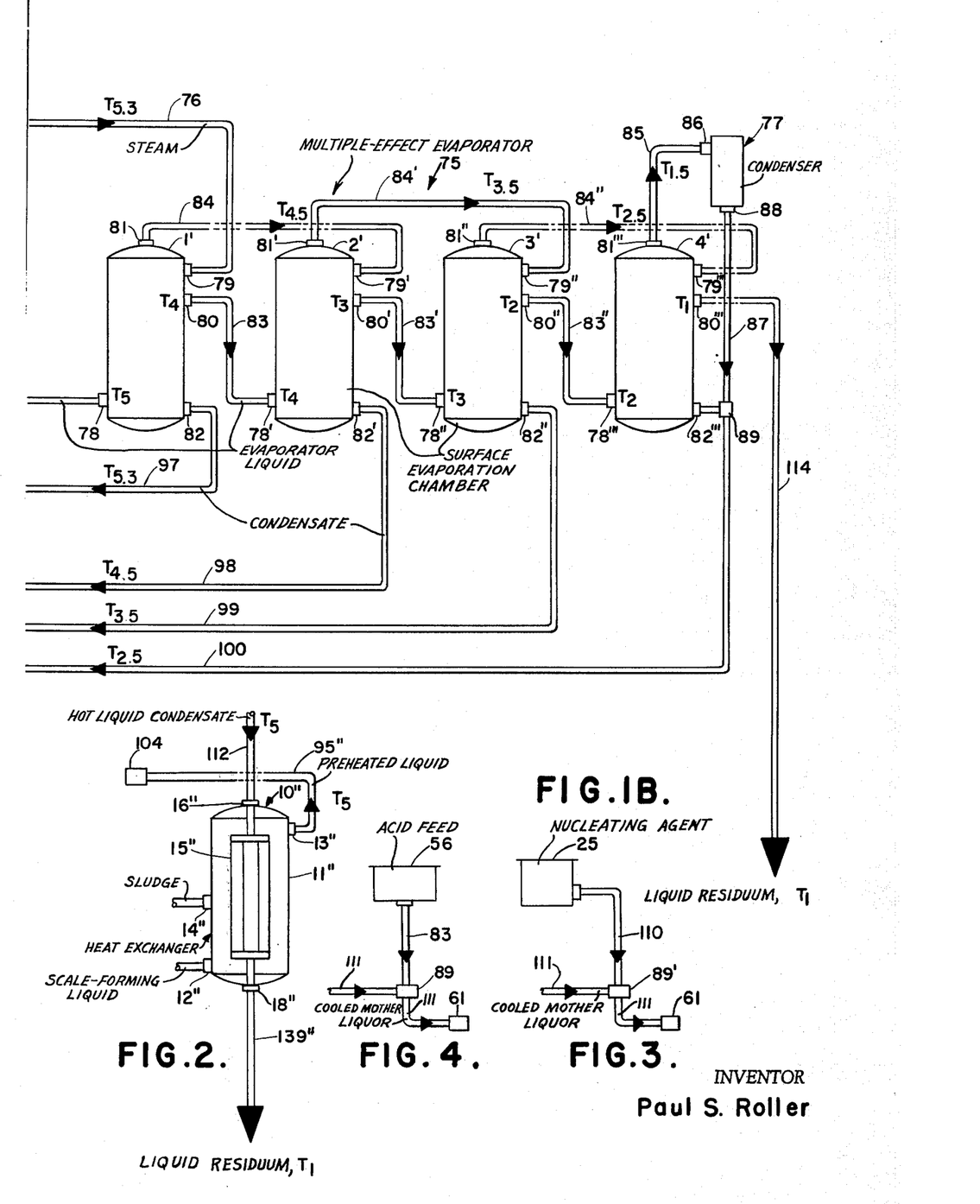
FIG. 2 is a diagrammatic representation of an alternate preheat heat exchanger.
FIG. 3 is a fragmentary view of a nucleating agent feed means.
FIG. 4 is a fragmentary view of an acid feed means.

Having reference to the apparatus shown in FIG. 1, the principal units thereof comprise preheat exchangers 10 and 19 admitting scale-forming liquid and hot evaporator discharge and reciprocally passing preheated liquid and distillate; thermoprecipitator 26, comprising vessel 27 and appurtenacnes thereto, receiving preheated liquid and steam and yielding gases, scale compound precipitate settled as sludge and hot mother liquor; steam purger 39, comprising vessel 40 and appurtenances thereto, admitting hot mother liquor and steam and passing purged hot mother liquor and after-purge steam; cooler 50, comprising in combination flash evaporator 47 and vapor compressor 51, receiving purged hot mother liquor and passing compressed vapor constituting recovered steam and cooled mother liquor; and in combination vapor compression evaporator 57 and multiple effect evaporator 75 admitting cooled mother liquor and yielding evaporator discharge.

Configurational details of the apparatus units are most aptly recited in conjunction with a description of the process terminating with the production of distillate and liquid residuum.

Scale-forming liquid in conduit 90 at ordinary temperature $T_1$ is delivered by pump 91 to conduit 92, whence at junction 93 it is split into two streams, one entering preheat heat exchanger 10 at inlet 12 through conduit 94 while the other enters preheat heat exchanger 19 at inlet 12' through conduit 96. Reciprocal heat transfer takes place with evaporator hot condensate discharge in counter current flow, and preheated to temperature $T_5$ the liquids issue respectively from outlet 13 of said heat exchanger 10 into conduit 95 and from outlet 13' of said heat exchanger 19 into conduit 101. The streams are recombined at junction 104 which is connected to conduit 103 from which preheated liquid passes to thermoprecipitator 26 for further processing.

If preheat temperature $T_5$ is excessive, scale formation by the liquid is apt to occur in said preheat heat exchangers. However, the tendency to this is much less than in an evaporator at the same temperature, principally because singularities due to liquid-vapor transformations are lacking, the liquid remains unconcentrated and solubilizing carbon dioxide is retained in solution.

If the inherent resistance to scale formation in preheat is insufficient, scale suppression measures may be applied. These preferably involve the addition to the liquid of scale seeds or of nucleating agent as opposed to acid in view of the resource of alkaline compound thermal precipitation.

Scale seeds are freely available in the form of settled precipitate or scale sludge in thermoprecipitator 26, of which a required portion, up to about 3% of the liquid, may be added by means of pump 105 connected to sludge outlet 35 of said thermoprecipitator. In order to avoid setting of transferred sludge, it may be diluted by preheated liquid passing from conduit 107 to sludge outlet 35; and, in addition, the scale-forming liquid receiving the sludge may be partly heated, for example to temperature $T_{2.5}$ as indicated illustratively by conduit 106 terminating at an appropriately positioned inlet 14 on preheat heat exchanger 10 and conduit 106' terminating on inlet 14' of preheat heat exchanger 19.

Alternately, feed means 25 may be employed to deliver a nucleating agent to the scale-forming liquid, preferably ferric chloride or ferric hydroxide as aforesaid, through conduit 110 connected to an inlet of pump 91.

Figure 5:
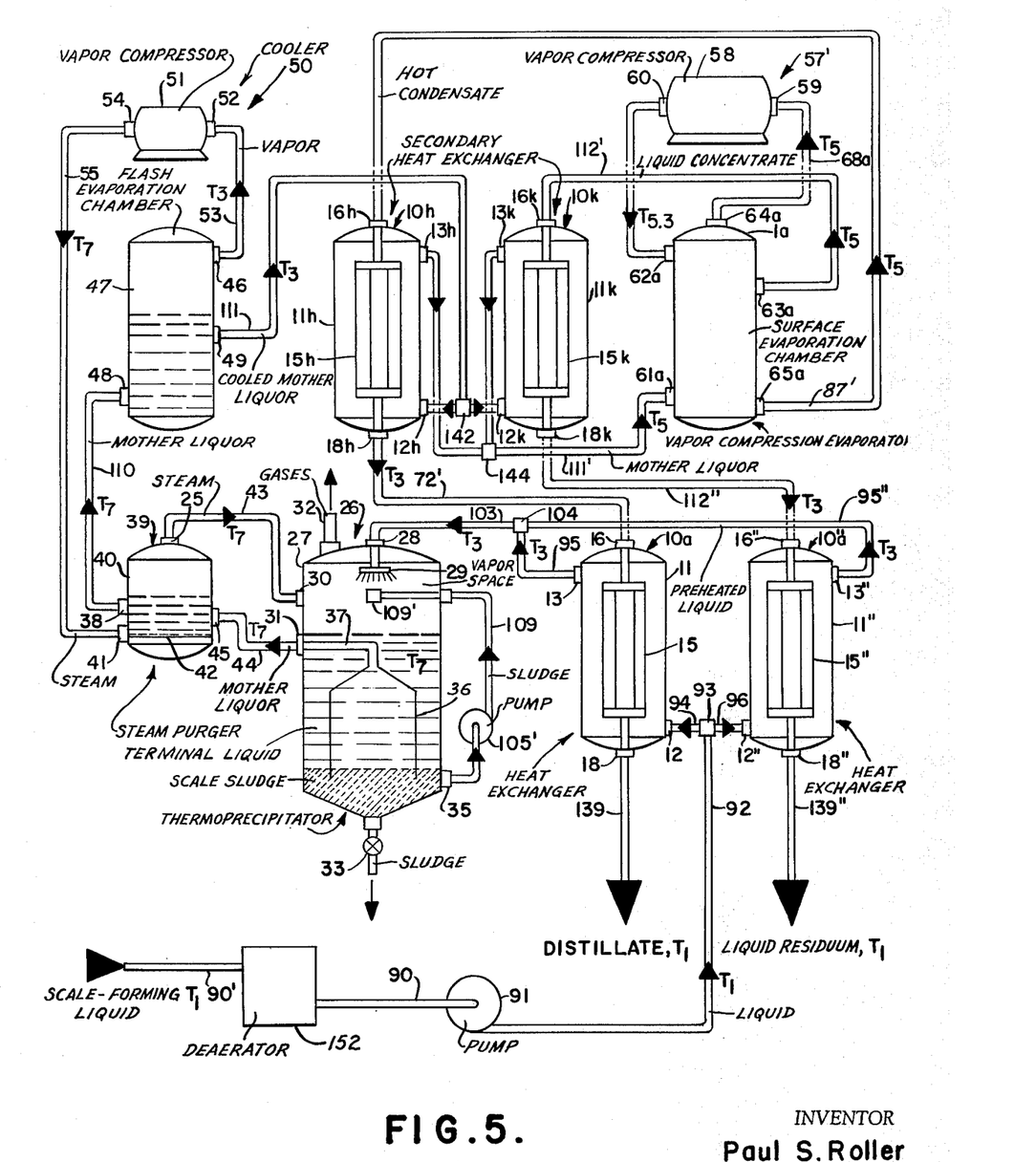
FIG. 5 is a diagrammatic representation of an apparatus alternate to that of FIG. 1.

In order to counteract corrosion in the preheat heat exchangers, deaerator 152 may be placed in the line conveying scale-forming liquid, for example between conduits 90' and 90 as shown in FIG. 5. In the instance that nucleating agent feed means 25 is employed, and comprises an electrolytic cell of iron anodes as aforesaid, the primary product of this cell, ferrous hydroxide, will scavenge oxygen from the scale-forming liquid, substantially deoxygenating it in supplementation of the generally limited effect of said deaerator.

The preheated liquid, incorporating or not scale seeds or nucleating agent, passes from said conduit 103 to inlet 29 on vessel 27 of thermoprecipitator 26, which inlet communicates with spray heat 29 or other suitable means of subdividing and dispersing the preheated liquid. The spray heat transmits the liquid at temperature $T_5$ into a vapor space in said vessel where it comes into contact with steam entering at temperature $T_7$ through inlet 30 fronting upon said vapor space. Condensation of the steam occurs, with attendant dilution and further heating of the preheated liquid to form a terminal liquid beneath said vapor space having an elevated temperature T7 identical with that of the entering steam.

At terminal temperature $T_7$, which preferably is between 250°F and 350°F, scale-forming compounds of calcium and magnesium and minor compounds precipitate or crystallize from the liquid and settle to the bottom of vessel 27 as scale sludge. Concurrently, carbon dioxide resulting from decomposition of of bicarbonates and carbonates in solution, oxygen and other gases are expelled, with steam held back, through vent condenser means 32.

Scale seeds, when introduced into the scale-forming liquid as said, play a useful role in initiating and extending the scale compound precipitation in thermoprecipitator 26. Nucleating ferric hydroxide plays a similar role, and moreover being a flocculating agent serves also to settle the precipitate rapidly.

In the instance that scale seeds are not utilized within the preheat heat exchangers, they may still desirably be made available for thermoprecipitator 26 by having direct recourse to the scale sludge therein. With this in mind, as shown in FIG. 5, a portion of the scale sludge at outlet 35 may be recirculated by pump 105' through conduit 109 to scale seed disperser means 109' in contact with liquid said thermoprecipitator.

The terminal liquid produced in thermoprecipitator 26 passes downward in vessel 27 thereof, then reverses itself and flows upward into chamber 26, situated concentrically in said vessel immersed in terminal liquid therein. During the reversal of flow, the liquid perforce passes through the scale sludge, as a result of which solubility equilibrium between scale compounds and terminal liquid, if not earlier attained, is advanced to completion.

Depending upon temperature and other factors related to reaching equilibrium, retention of the terminal liquid in thermoprecipitator 26 may vary between about 5 and 120 minutes.

The hot mother liquor passes from outlet 31 into conduit 44, and thence through inlet 45 to vessel 40 of steam purger 39. Steam at inlet 41 enters distributor 42 which dispenses it in fine bubbles through the hot mother into the vapor space thereabove. The flowing steam strips the liquid of residual gases, including carbon dioxide and oxygen, while collaterally residual alkaline scale compounds precipitate. Being at the same temperature $T_7$ as the hot mother liquor, the steam is non-condensing and effective.

As a result of the reduced partial pressure of carbon dioxide in the presence of steam, residually dissolved calcium carbonate and magnesium hydroxide precipitate in steam purger 39, the crystals formed being suspended in the purged hot mother liquor.

Residual oxygen in the hot mother liquor, which in thermoprecipitator 26 will have been reduced to about 0.1 ml $O_2$/liter, is now further reduced to less than 0.005 ml $O_2$/liter. An exceedingly low oxygen content of this order is requisite for maximum corrosion prevention at high temperatures, particularly in reference to evaporation.

The used purging steam containing removed carbon dioxide and oxygen passes from vessel 40 into outlet 25 and conduit 43 to thermoprecipitator 26 as said steam, while purged hot mother liquor issues into outlet 38 and conduit 110 for further processing before evaporation.

The further processing consists generally in cooling the hot mother liquor and forming vapor therefrom for use to any advantage or for re-use as said steam.

Preferably, the hot mother liquor is cooled by adiabatic partial vaporization to a temperature equal to that of the preheated liquid, while the vapor formed is compressed to produce steam for the thermal precipitation. The cooled mother liquor, in concentratiin of dissolved constituents and in quantity substantially equalling that of the original scale-forming liquid, is thence evaporated at the temperature of preheat, or flexibly at a higher or lower temperature by resort to interposed secondary heat exchange means, as will be described.

In particular then and in accordance with the processing as preferred, the hot mother liquor flows from conduit 110 through inlet 48 into flash evaporator 47, where it is cooled by partial vaporization from precipitation temperature $T_7$ to preheat temperature $T_5$, and issues as cooled mother liquor at temperature $T_5$ from outlet 49 into conduit 111 to vapor compression evaporator 57.

The flashed vapor concurrently passes at temperature $T_5$ from outlet 46 and conduit 53 into inlet 52 of vapor compressor 51. It issues therefrom compressed and at temperature $T_7$ through outlet 54 into conduit 55 as steam for steam purger 39 and thermoprecipitator 26. Since this steam is at the same temperature and in the same amount as that initially for thermoprecipitator 26, a cycle of steam condensation, recovery and re-condensation is established through a loop including cooler 50, steam purger 39 and thermoprecipitator 26.

The compression temperature differential applicable to vapor compressor 51 is equal to the temperature difference $T_7 - T_5$. If the differential is greater than about 30°F, vapor compressor 51 may comprise two or more stages.

Vapor compression evaporator 57 includes a plurality of surface evaporation vessels having liquid and vapor inlets and outlets, illustratively three vessels numerated 1, 2 and 3. Evaporating liquid passes from the lower to higher numbered vessels in sequence, typically from outlet 60' of vessel 2 to inlet 61'' of vessel 3. With cooled mother liquor to be evaporated at its entering temperature $T_5$, vapor from each said vessel in delivered at approximately this temperature to vapor compressor 58, typically through outlet 64' of vessel 2 to conduit 68 and inlet 59 of vapor compressor 58. The vapor is compressed and issues from outlet 60 at a differentially higher temperature $T_{5.3}$ into conduit 70 and junction 74, thence to conduit 69 and the compressed vapor inlets 62, 62' and 62'' respectively of vessels 1, 2 and 3.

Condensate formed of compressed vapor issues from outlets 65, 65' and 65'' of said vessel collectively into conduit 71, and thence as hot evaporator discharge substantially at temperature $T_5$ into conduit 72 and inlet 16 of preheat heat exchanger 10. Flowing through conduit means 15 therein countercurrently to preheating liquid, the evaporator discharge passes into conduit 139 as distillate product at temperature $T_1$.

Hot liquid concentrate flows at approximately $T_5$ from outlet 63'' of final vessel 3 into conduit 112 and inlet 78 of first effect vessel 1' of multiple effect evaporator 75. Concurrently, a portion of the compressed vapor at junction 74, supplemented by steam as required in conduit 73, flows at temperature $T_{5.3}$ into conduit 76 and vapor inlet 79 of said first effect vessel.

Multiple effect evaporator 75 comprises illustratively four effects including respectively vessles 1' to 4', each of which receives evaporating liquid sequentially from a lower to higher effect, typically from liquid outlet 80' of vessel 2' through conduit 83' to liquid inlet 78' of vessel 3'; vapor similarly is transferred sequentially from a lower to higher effect, typically from vapor outlet 81' of vessel 2' through conduit 84' to vapor inlet 79''' of vessel 3'. Effect by effect, the vapor is at a serially decreasing pressure and temperature in view of a progressive vacuum imposed by vapor condenser 77 acting through conduit 85 connected between outlet 86 thereof and inlet 81''''  of last stage vessel 4'. The evaporating liquid likewise serially decreases in temperature, as illustratively indicated for both vapor and liquid in FIG. 1.

The vapor transferred to each effect, while causing evaporation therein condenses and issues at a condensate outlet, typically outlet 82' of vessel 2'. Comprising hot evaporator discharge, the condensates at temperatures varying from $T_5$ to $T_2$ flow into a plurality of respective conduits 97 to 100, which terminate respectively at inlets 21 and 21''' of preheat heat exchanger 19.

The latter is a representational form of a plurality of individual heat exchangers adapted to each of said conduits 97 to 100. Flowing countercurrently to preheated liquid in heat exchanger 19 through conduit means 20 therein comprising sections 21 to 21''' interconnected by conduits 22 to 22'', the combined hot condensates issue cooled into conduit 115 as distillate product at temperature $T_1$ and a complement to that in conduit 139. Concurrently, from outlet 80''' of last effect vessel 4' liquid concentrate issues into conduit 114 as liquid residuum product at temperature $T_1$.

The object of combining vapor compression evaporator 57 with multiple effect evaporator 75 is to evaporate, subsequent to vapor compression evaporation at $T_5$, at decreasing temperatures $T_5$ to $T_2$ in order to achieve an increase in concentration factor over that presumed available with evaporation limited to the higher temperature $T_5$.

In the instance that a suitable concentration factor is attainable, however, at $T_5$, vapor compression evaporator 57 may be employed exclusively. In this case, heat exchanger 10'', similar to heat exchanger 10, replaces heat exchanger 19. As indicated in FIG. 2, evaporator discharge in conduit 112 passes to inlet 16'' of said heat exchanger 10''; and, flowing counter-currently to the preheated liquid therein, passes into conduit 139'' as liquid residuum at temperature $T_1$ correlative to distillate at the same temperature in said conduit 139.

Alternately, multiple effect evaporator 75 may be employed exclusively, omitting vapor compression evaporator 57 and its interconnected preheat heat exchanger 10. Cooled mother liquor in conduit 111 passes then directly to liquid inlet 78 of effect 1', and in the manner as above described in converted into distillate product in conduit 115 and liquid residuum product in conduit 114.

According to the process mode represented by the apparatus of FIG. 1, the temperature $T_5$ of evaporation matches the temperature $T_5$ of cooled mother liquor. The alternate apparatus shown in FIG. 5 represents a mode according to which the temperature of the cooled mother liquor is modified to conform to a desired other temperature of evaporation. A description of this apparatus which follows is confined in the main to the above noted and other alternate conditions involved.

Scale-forming liquid is preheated to temperature $T_3$ in preheat heat exchangers 10a and 1''a; and, brought into contact with steam at temperature $T_7$ in thermoprecipitator 26, issues at outlet 31 as hot mother liquor likewise at temperature $T_7$.

On the basis that alkaline scale compound precipitation as well as oxygen removal in thermoprecipitator 26 is sufficiently complete, steam purger 39 is now omitted from the apparatus, and so hot mother liquor passes directly into conduit 110 to cooler 50. The flashed vapor issues compressed into conduit 55 as steam at temperature $T_7$ and passes directly to steam inlet 30 of thermoprecipitator 26, while cooled mother liquor issues at temperature $T_3$, identical with that of said preheat, into conduit 111 and junction 142, and thence in split stream to inlet 12h of secondary heat exchanger 10h and inlet 12k of secondary heat exchanger 10k.

The temperature of cooled mother liquor is modified in said heat exchangers by reciprocal heat exchange with hot evaporator discharge. In the exchange, the temperature is modified either upward or downward, in either case to the desired temperature of evaporation, depending upon whether the temperature of evaporator discharge is respectively greater or less than that of cooled mother liquor. Illustratively, in FIG. 5 the temperature of cooled mother liquor is modified upward from its normal temperature $T_3$ to evaporation temperature $T_5$, while the temperature of evaporator discharge is reciprocally modified downward from $T_5$ to $T_3$.

With these temperature relations borne in mind, one part of cooled mother liquor flows from said inlet 12h through heat exchanger 10h to outlet 13h thereof and junction 144, and the other part flows from said inlet 12k through heat exchanger 10k to outlet 13k thereof and likewise to said junction 144. With the parts reunited herein at temperature $T_5$, the temperature-modified mother liquor flows into conduit 111' to inlet 61a and chamber 1a of single stage vapor compression evaporator 57'. Hot condensate, constituting an evaporator discharge at temperature $T_5$, passes through outlet 65a and conduit 87' to inlet 16h of heat exchanger 10, while hot liquid concentrate, constituting another evaporator discharge at temperature $T_5$, passes through outlet 63a and conduit 112' to inlet 16k of heat exchanger 10k. Flowing countercurrently to cooled mother liquor in heat exchanger 100h, condensate reduced to temperature $T_3$ issues through outlet 18h and conduit 72' to inlet 16 of preheat heat exchanger 10a, whence it passes into outlet 19 and conduit 139 as distillate at temperature $T_1$, while liquid concentrate at temperature $T_3$ issues through outlet 18k and conduit 112'' to inlet 16'' of preheat heat exchanger 10''a, whence it passes into outlet 18'' and conduit 139'' as liquid residuum at temperature $T_1$.

Alternately, the temperature of the cooled mother liquor may be modified downward. Having reference to FIG. 10, cooled mother liquor at temperature $T_5$ enters heat exchangers 10h and 10k in split flow from conduit 111 and junction 142. Issuing from each of said heat exchangers at temperature $T_4$, less than entering temperature $T_5$, the split flows are recombined at junction 144, and the combined flow of further cooled mother liquor passes at temperature $T_4$ into conduit 111' to evaporator 1a.

Figure 10:
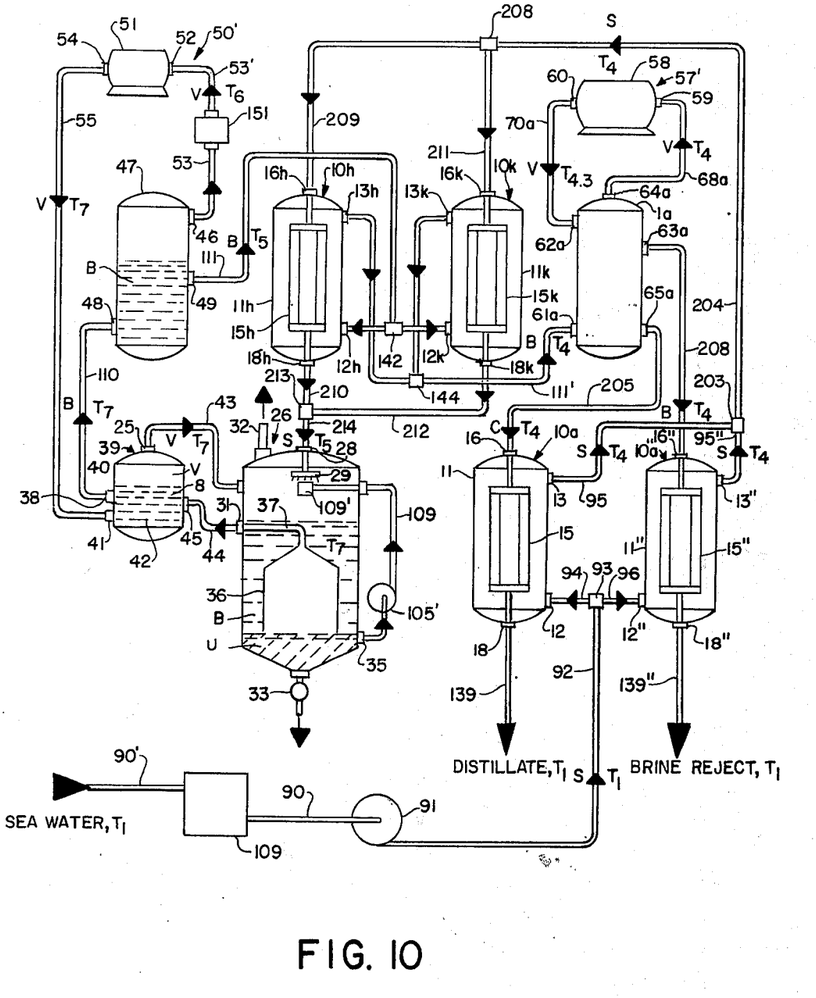
FIG. 10 is a diagrammatic representation of another apparatus alternate to that of FIG. 1.

Scale-forming liquid, preheated in heat exchangers 10a and 10''a, issues from junction 203 into conduit 204 at temperature $T_4$, and from junction 208 passes in split flow to said heat exchangers 10h and 10k. It thence issues respectively into conduits 210 and 212 at temperature $T_5$. Recombined at junction 213, the preheated liquid, now further preheated to temperature $T_5$, passes into conduit 214 to thermoprecipitator 27.

In view of the processing as described and resultant formation of a beneficially prepared mother liquor, a high concentration is attainable in its evaporation. The magnitude of the concentration factor is predictable from knowledge of the solubilities of calcium sulfate, at high temperatures specifically anhydrite. The concentration factor is higher the greater the degree of antecedent precipitation of anhydrite and therefore the greater the temperature $T_7$ in thermoprecipitator 26, and in evaporation when the crystallizing phase is the metastable hemihydrate. The temperature of evaporation shall conformably lie between about 190°F and 220°F. Under this condition and with the precipitation temperature between 250°F and 350°F as stated, the concentration factor attainable in the process extends from about 3.3 to 7.5

This achievement presupposes the absence of alkaline scale-forming residuals in evaporation, which will be effected by the proper application of thermoprecipitator 26, and more surely by that of steam purger 39 in sequence with said thermoprecipitator.

Postulating, nevertheless, the presence of alkaline scale-forming residuals in the evaporation step, suitable scale suppression measures against the corresponding minimal alkaline scale formation may be taken, for example adding to cooled mother scale seeds specifically applicable to alkaline scale compounds, or a nucleating agent, preferably ferric chloride or ferric hydroxide as aforesaid. Representative of the latter procedure, as depicted in FIG. 3, nucleation agent feed means 25 communicates by way of conduit 110 and junction 89' with conduit 111 conveying mother liquor to inlet 61 and chamber 1 of vapor compression evaporator 57.

Alternately, cooled mother liquor may be treated with an acid in order to solubilize the alkaline scale-forming residuals. Representative of this procedure, as depicted in FIG. 4, acid feed means 56 communicates by way of conduit 83 and junction 89 with conduit 111 conveying cooled mother liquor to said inlet 61 and evaporator 57.

Scale seed for cooled mother liquor, as alternate to said nucleating agent or acid, is freely available in the process as alkaline compound precipitate in suspension in the hot mother liquor in steam purger 39, whence it is carried through cooler 50 into vapor compression evaporator 57 for service therein. This functioning to provide seed in evaporation adds to the benefits of steam purger 39 to the process.

In view of the inconsiderableness in general of the alkaline scale compound residuals, expectedly less than about 5 ppm, the quantity required of scale suppressive is correspondingly minimal. If it is established that none normally is required, the scale seed from steam purger 39, nevertheless, provides security against the contingent occurrence of alkaline residuals.

The achievment herein of a high concentration factor implies the employment of a surface heat transfer evaporator selected from a variety of such including a submerged coil evaporator, but preferably a vapor compression evaporator, a multiple effect evaporator or both taken in combination, as hereinabove described.

Having described the process and apparatus in its main and novel features as required for a proper understanding thereof, certain factors will now be considered in greaer detail with a view to gaining improved efficiency in related processing.

In regard to cooler 50, the temperature $T_7$ of the compressed vapor is that of saturated vapor since the temperature of saturation alone is pertinent to the condition that the pressure of the steam entering thermoprecipitator 26 shall equal the vapor of the terminal liquid at temperature $T_7$. However, it is a wellknown property of vapor compression, originating in its being isentropic, that the vapor issuing into outlet 54 and conduit 55 is superheated. The superheat temperature is, of course, greater than the saturation temperature $T_7$ and may be denoted $T_7(s)$ to show its interrelation therewith.

Superheat of the steam issuing from vapor compressor 51 is significant in view of improved functioning of the steam in thermoprecipitator 26 or steam purger 39, as will be described hereinbelow.

Having reference to thermoprecipitator 26, equations (1) and (2) express the thermal decomposition of the alkaline scale-forming compounds in the bicarbonate form, with similar equations applying to the carbonate form.

(1) $Ca(HCO_3)_2 = CaCO_3 + H_2O + CO_2$ (2) $Mg(HCO_3)_2 = Mg(OH)_2 + 2CO_2$

The equations show that precipitation of the alkaline scale compounds, $CaCO_3$ and $Mg(OH)_2$, from the corresponding alkaline scale-forming compounds is accompanied in each case by the formation of carbon dioxide. The latter is a reaction product and its removal is a necessary condition for extended thermal precipitation of the alkaline scale compounds.

Carbon dioxide incipiently formed in the liquid is displaced or disengaged as gas in virtue of its insolubility. Elimination of the displaced carbon dioxide requires that the gas be moved from the site of its formation and expelled. Conditions in thermoprecipitator 26 are well adapted to this movement and expulsion of the gas.

In the first place, at temperature $T_7$ the steam entering thermoprecipitator 26 is at a pressure well above atmospheric, while at vent condenser means 32 the pressure is substantially atmospheric. Consequently, a pressure gradient obtains in the vapor space extending from terminal liquid to vent condenser means 32. Carbon dioxide formed and disengaged either from the descending droplets or terminal liquid is constrained to move along the pressure gradient to vent condenser means 32 where it is expelled.

Such movement applies also to the added steam. Being in great excess over the carbon dioxide, as will be demonstrated, the steam as it rises above the terminal liquid and traverses the droplets before condensing in its more massive movement sweeps the carbon dioxide toward vent condenser means 32, thereby greatly aiding the self-movement of the gas. Therefore, besides its basic function of providing the necessary heat for thermal precipitation, the steam provides also significant dynamic assistance in the necessary removal of carbon dioxide, promoting in general its expulsion.

In other ways also does the steam complement its heating function. At a mutual temperature $T_7$ with that of the liquid, it tends to penetrate the liquid, and while passing therethrough purges it of carbon dioxide, therewith accelerating its displacement from the liquid.

Then again, in the case where it enters thermoprecipitator 26 superheated at temperature $T_7(s)$, when in contact with liquid at saturation temperature $T_7$, whether as droplets or terminal liquid, the superheated steam transmits heat as its temperature decreases from $T_7(s)$ to $T_7$. Reciprocally the liquid boils at $T_7$, resulting in an enhanced purge and displacement of carbon dioxide therefrom.

As to where the superheat is put to use depends on the apparatus mode. in that of FIG. 1, steam passes from vapor compressor 51 to steam purger 39, and in view of its superheat the hot mother liquor boils and is purged to a superior degree. The after-purge steam is saturated at temperature $T_7$, and so in its subsequent utilization in thermoprecipitator 26 superheat is unavailable to the liquid therein.

A leadong complementary function of the steam in thermoprecipitator 26 is its dilution of disengaged carbon dioxide and reduction of the partial pressure to a low value. A low partial pressure is akin to flow over the liquid in inducing rapid displacement of carbon dioxide therefrom. More basically, in accordance with the equilibrium indicated by equatims (1) and (2), it corresponds to a necessary high degree of decomposition and precipitation of the alkaline scale compounds at a suitably elevated temperature $T_7$.

In order to effect a low partial pressure in thermoprecipitator 26, sufficient steam may be added arbitrarily and in excess of that required to increase the temperature of preheated liquid from $T_5$ to $T_7$. An excess, however, represents a supernumerary cost of processing which is to be avoided if possible. In the instance of liquids of ordinary alkalinity, and in particular that of sea water, the steam required for raising the temperature to $T_7$ proves to be sufficient to effect an exceedingly low partial pressure of carbon dioxide.

In the instance of sea water for example, with a preheat temperature as high as 220°F and proportionally adverse to a high steam requirement, the fraction by weight of steam to sea water required to further heat the preheated liquid to a temperature $T_7$ reaching from 248°F to 320°F is expressed in Table 1 and is observed to vary respectively from 0103 to 0.11. The carbon dioxide resulting from complete thermal decomposition of alkaline scale-forming compounds in sea water is $2.3 \times 10^{-3}$ gram mols / 1,000 grams sea water. The gram mols of steam is its fraction by weight multiplied by 1,000/18. The partial pressure of carbon dioxide in atmospheres is substantially the ratio of these values, and is observed from the last row of Table 1 to vary from $10 \times 10^{-4}$ to $4 \times 10^{-4}$ as precipitation temperature $T_7$ increases from 248°F to 320°F. Since the partial pressure decreases with rise in $T_7$, its effect is to reinforce an increase of temperature in effecting a greater precipitation of alkaline scale compound.

Table 1

Partial Pressure of Carbon Dioxide in Thermoprecipitator 26 in the Instance of Sea Water

| Temperature of Steam, $T_7$ | 248°F | 266°F | 284°F | 302°F | 320°F |
|---|---|---|---|---|---|
| Fraction of Steam by Weight | 0.03 | 0.05 | 0.07 | 0.09 | 0.11 |
| Partial Pressure of Carbon Dioxide | $10\times10^{-4}$ | $8\times10^{-4}$ | $6\times10^{-4}$ | $5\times10^{-4}$ | $4\times10^{-4}$ |

At the partial pressures of carbon dioxide and correlated temperatures $T_7$ expressed in Table 1, precipitation of alkaline scale compound in all instances is indicated to be virtually complete, with residuals in the low ppm range decreasing rapidly with increase in temperature. Under these conditions, moreover, the alkaline compound that precipitates is principally or altogether magnesium hydroxide rather than the alternate of calcium carbonate.

The partial pressure of carbon dioxide in steam purger 39 is considerably smaller than the values set forth in Table 1 because of the minimal content of carbon dioxide in the hot mother liquor. The temperature $T_7$ being the same, precipitation of alkaline scale compound, and more particularly magnesium hydroxide, will occur subsequently and in addition to that occurring in thermoprecipitator 26, in accordance with process requirement.

The dynamics of carbon dioxide displacement in steam purger 39 is especially favorable, and reaction time correspondingly low, in view of a combination of cooperating factors including an initial high temperature $T_7$ of the liquid, penetration of the liquid by noncondensing steam and boiling induced by superheaed steam.

Figure 6:
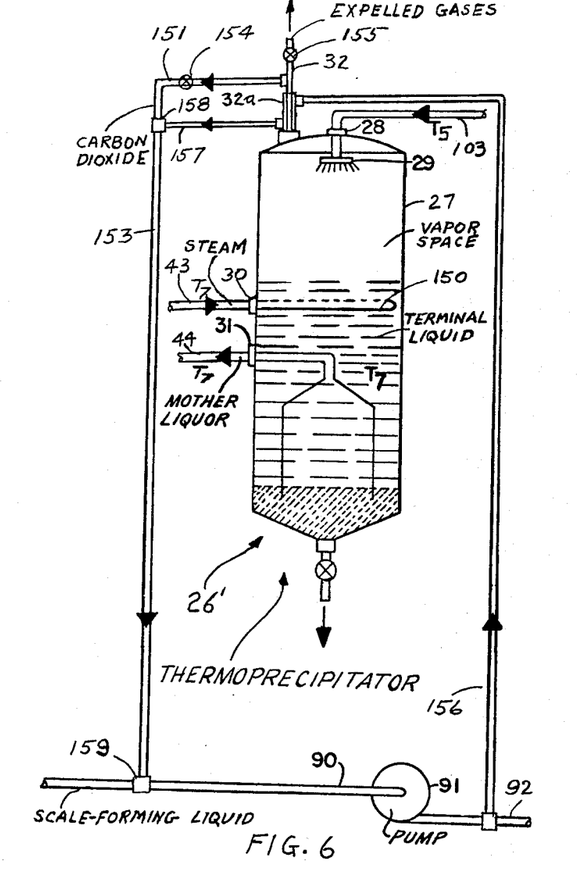
FIG. 6 is a diagrammatic representation of a thermoprecipitator and accessory conduit means for carbon dioxide expelled therefrom.

In the upper reaches of thermoprecipitator 26, the concentration of carbon dioxide increases because of progressive condensation of the added steam and attains its maximum at the uppermost end beneath vent condenser means 32. While the carbon dioxide is being expelled therethrough, a portion may be diverted and advantageously utilized as an alternate for the prevention of scale formation in preheat. Air will be present with the carbon dioxide but in such trivial amount, particularly if deaerator 152 is employed, that its presence may be neglected and the gas referred to as if it were entirely carbon dioxide. Water vapor in the carbon dioxide may be substantialy removed by condensation in contact with condenser jacket 32a on said vent condenser means, as shown in FIG. 6.

The carbon dioxide is combined with scale-forming liquid in conduit 90 by passing it through conduits 151 and 153 to junction 159 on said conduit 90. The dosage of carbon dioxide may be regulated by valve 154 on conduit 151 and valve 155 on vent condenser means 32. Cooling water for said jacket may comprise scale-forming liquid recirculated through conduits 156, 157 and 153 and intercepting carbon dioxide at junction 158, thence moving with it to said junction 159.

The added carbon dioxide dissolves in the scaleforming liquid and solubilizes alkaline scale compound, normally calcium carbonate, which would otherwise precipitate and form scale in the preheat heat exchangers.

The required dosage of carbon dioxide in ppm of scale-forming liquid is slight. In the instance of sea water, the minimum dosage for preventing scale is expressed in terms of the temperature of preheat in Table 2, which gives also the pH of the sea water subsequent to the carbon dioxide addition.

Table 2

| Dosage of Carbon Dioxide to Prevent Scale-formation in Preheat of Sea Water | | |
|---|---|---|
| Temperature of Preheat, $T_5$ | 212°F | 257°F | 302°F |
| ppm $CO_2$ | 40 | 85 | 215 |
| pH | 6.5 | 6.2 | 5.8 |

It is observed from Table 2 that the required dosage of carbon dioxide increases with increase in the temperature of preheat from 212°F to 302°F, while the pH correspondingly decreases. At the latter temperature, an abnormally large increment of carbon is entailed, which probably is related to the potential alkaline scale compound being magnesium hydroxide rather than calcium carbonate. A temperature of 302°F in preheat is of academic interest only in view of the precipitation of anhydrite, and the real dosages and resultant pH are those for a range of preheat temperatures shifted slightly below the range 212°F to 257°F. It may be noted that no restriction exists on the dosage since the carbon dioxide is recirculated to thermoprecipitator 26 as well as being continually formed therein.

Figure 7:
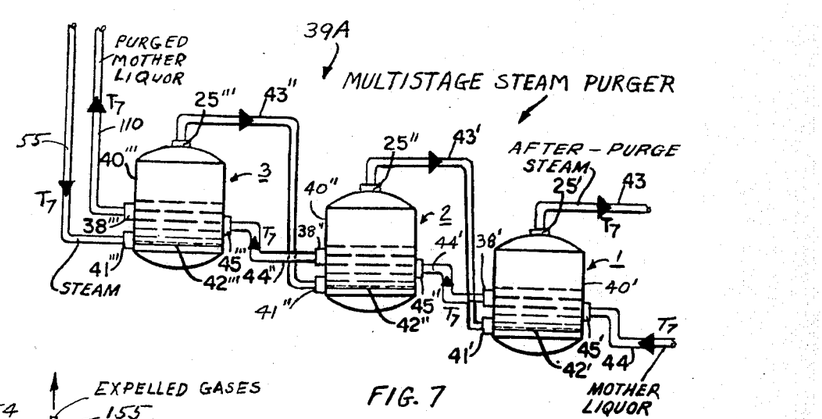
FIg. 7 is a diagrammatic representation of a steam purger in multistage conformation.
Figure 8:
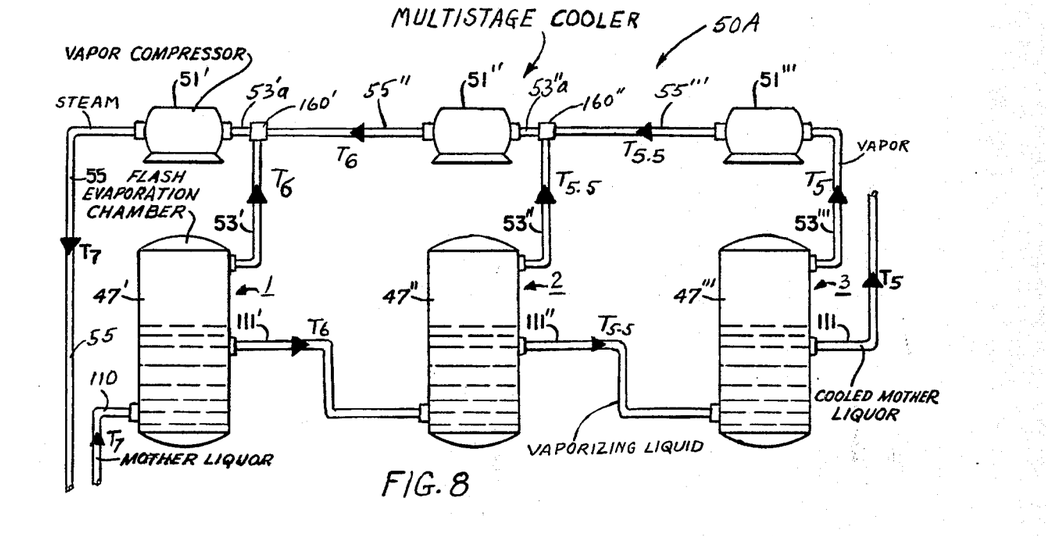
FIG. 8 is a diagrammatic representation of a cooler in multistage conformation.
Figure 9:
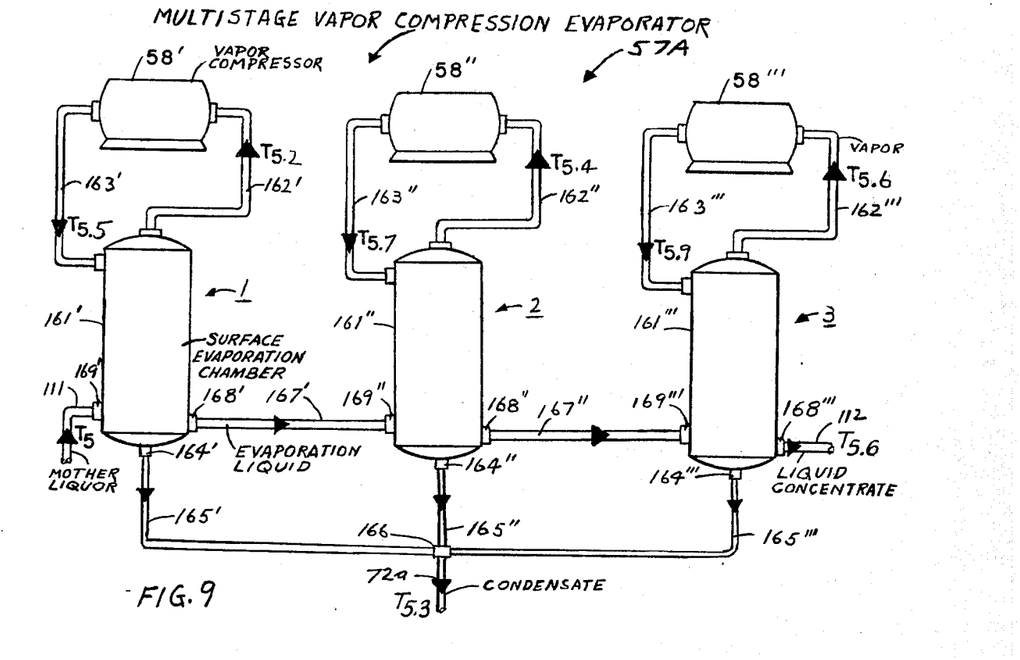
FIG. 9 is a diagrammatic representation of a vapor compression evaporator in multistage conformation.

Improvements will now be described in steam purger 39, cooler 50 and vapor compression evaporator 57' based upon a transition from a single stage to a particular multistage ordering of each. Considering first steam purger 39, a situation may arise in which an excess of alkaline scale compound precipitation may have to be effected therein because of a related deficiency in thermoprecipitator 26, either contrived, for example, in order to secure anhydrite as a by-product low in coprecipitated alkaline scale compound, or as may occur otherwise. Any such deficiency is intensified by the presence of reciprocal excess carbon dioxide in the after-purge steam passing to the thermo-precipitator.

In order to positively precipitate excess alkaline scale-forming compound in the hot mother liquor, it may be subjected to multiple purging with counterflowing steam. Steam purger 39A is an embodiment of this procedure, which as shown in FIG. 7 is in multistage conformation illustratively including three stages, numerated 1, 2 and 3. Each stage comprises a vessel similar to vessel 40 depicted in FIG. 1, inclusive of inlets and outlets thereof and the reciprocal flow of liquid and steam therein. Liquid flows from lower to higher stages in sequence toward increasingly purged mother liquid; typically for all stages, liquid outlet 38' of stage 1 vessel 40' is connected by conduit 44' with liquid inlet 45" of stage 2 vessel 40". Conversely, steam flows from higher to lower stages toward an increasing content of carbon dioxide thereof typically for all stages, steam outlet 25''' of stage 3 vessel 40''' is connected by conduit 43''' to steam inlet 41'' of stage 2 vessel 40''. Throughout the sequence mother liquor and steam are each at a uniform temperature $T_7$.

Conformable to the condition of countercurrent flow, at one end of the sequence inlet 45' of first stage vessel 40' is disposed to fresh hot mother liquor entering from conduit 44 while outlet 25' is disposed to after-purge steam passing into conduit 43; at the other end of the sequence, inlet 41''' of last stage vessel 40''' is disposed to fresh steam entering from conduit 55 while outlet 38''' is for purged mother liquor passing into conduit 110.

Considering cooler 50, because of the generally high value of the compression temperature differential, $T_7 - T_5$, the corresponding compression ratio will normally be greater than suitable for most effective operation of vapor compressor 51. The compression ratio may be reduced to any low value by employing a plurality of vapor compressors each subject to a divisional temperature differential having an appropriate value less than $T_7 - T_5$. Cooler 50a is an embodiment providing a divisional temperature differential, which as shown in FIG. 8 is in multistage conformation illustratively including a plurality of three stages, numerated 1, 2 and 3. Each stage is similar to single stage cooler 50 shown in FIG. 1 and similarly includes as its principal elements in combination as described flash evaporator 47 and vapor compressor 51. Mother liquor flows from lower to higher stages in sequence toward greater cooling thereof, while vapor flows oppositely from higher to lower stages in sequence toward a higher temperature thereof.

Following now in particular the flow of liquid and vapor while describing the structural factors involved, from initial intake conduit 110 hot mother liquor enters stage 1 vessel 47' at temperature $T_7$ and, having been flash evaporated therein and cooled illustratively to temperature $T_6$, issues sequentially into conduit 111' to stage 2 vessel 47''. Herein it is further flash evaporated while cooling illustratively from $T_6$ to $T_{5.5}$, at which latter temperature it flows into conduit 111'' to stage 3 vessel 47'''. After flash evaporation in this final stage, it issues into conduit 111 as cooled mother liquor at temperature $T_5$.

Concurrently and in opposite sequence, flashed vapor of final stage 3 passes into vapor conduit 53''' to third stage vapor compressor 51''' and entering it at temperature $T_5$ issues compressed and at temperature $T_{5.5}$ into conduit 55'''. This conduit is in communication with stage 2 vapor conduit 53'' at junction 160'' from which the flashed vapor of stage 2 vessel 47'' is combined with the singly compressed vapor of stage 3 vessel 47''', the combined vapors entering conduit 53''a to the inlet of stage 2 vapor compressor 51''. Similarly, at junction 160' the flashed vapor of stage 1 vessel 47' entering from vapor conduit 53' is combined with the singly compressed vapor of stage 2 vessel 47'' and the doubly compressed vapor of stage 3 vessel 47''', the combined vapors entering conduit 53'a to the inlet of stage 1 vapor compressor 51'. The compressed vapor thereof is at temperature $T_7$ and passes into conduit 55 as steam for the process.

It is observed that the compression temperature differential is for each of the vapor compressors a fraction of the whole differential $T_7 - T_5$, for said vapor compressors 51', 51'' and 51''' being respectively and illustratively $T_7 - T_6$, $T_6 - T_{5.5}$ and $T_{5.5} - T_5$, corresponding presumptively to an acceptable compression ratio for each.

It is noted as a further advantage of multistage cooler 50A that the energy of compression decreases with increase in the number of stages, and even with two or three stages is substantially less than for a single stage cooler.

Considering now the evaporator for cooled mother liquor, at the high concentration factors attainable in the process, the boiling point elevation of the evaporating liquid may equal or exceed the temperature differential in evaporation, for example $T_{5.3} - T_5$ as depicted in the instance of vapor compression evaporator 57 shown in FIG. 1. Under this circumstance, for proper efficiency of evaporation it is necessary to take into account the boiling point elevation of the liquid. In the case of a vapor compression evaporator of present interest, the output of the vapor compressor must have a variable temperature that exceeds the variable temperature of boiling by a prescribed or constant temperature differential. Provision for this condition is neglected in the comparatively elementary mode represented by multistage vapor compression evaporator 57 shown in FIG. 1. The temperature of the evaporating liquid therein has been considered as substantially constant in each of the stage chamber 1, 2 and 3. Such an assumption may be tolerated when the concentration factor in evaporation is low, but it is improper in the instance of a high concentration factor.

Vapor compression evaporator 57A, shown in FIG. 9, is an embodiment which provides for compensation of boiling point elevation as evaporation progresses to an ever increasing concentration of the liquid. The evaporator is in multistage conformation, illustratively comprising three stages, numerated 1, 2 and 3. Each stage is similar to a single stage vapor compression evaporator, such as that numbered 57' and shown in FIG. 5 and comprises typically in the instance of stage 2 a surface heat transfer evaporation chamber 161" and vapor compressor 58" in combination including conduit 162" transferring vapor from said chamber to the inlet of said vapor compressor and conduit 163" conveying compressed vapor from the outlet of said vapor compressor to said chamber for effecting evaporation therein. Each chamber is provided with an inlet and reciprocal outlet for evaporating liquid and an outlet for condensate, typically in the instance of stage 2 respectively liquid inlet 169", liquid outlet 168" and condensate outlet 164".

The liquid outlet of a lower stage chamber is sequentially connected with the liquid inlet of a higher stage chamber by conduit, typically conduit 167" connecting liquid outlet 168" of stage 2 chamber 161" with liquid inlet 169" of stage 3 chamber 161'''. With respect to the first stage, cooled mother liquor at temperature $T_5$ enters chamber 161' thereof by way of conduit 111 and inlet 169', while with respect to the last stage liquid concentrate at an increased temperature representationally of $T_{5.6}$ issues from chamber 161''' thereof by way of outlet 168''' and conduit 112. The chamber of each stage is provided with an outlet for condensate, typically in the instance of stage 2 outlet 164" connected to conduit 165". Thus conduit and similar ones for each of the other said chambers come together at junction 166 from which collected condensate issues into conduit 72a at an increased temperature representationally of $T_{5.3}$. The differentials above $T_5$ for the evaporator discharge constituted by said liquid concentrate and said collected condensate is available as a heat transfer differential in the preheat heat exchangers to which they pass.

The capability of multistage vapor compression evaporator 57A to compensate for boiling point elevation is indicated by the temperature markings on FIG. 9. The temperature of the vapor increases with increase in stage number and for stages 1, 2 and 3 is representationally $T_{5.2}$, $T_{5.4}$ and $T_{5.6}$ respectively. The temperature of compressed vapor is for each stage greater than that of vapor, representationally and respectively $T_{5.5}$, $T_{5.7}$ and $T_{5.9}$. The paired difference in each instance represents the evaporation temperature differential for that stage. In the example illustrated by FIG. 9 the differences are constant over all stages, but they could be made different as required by appropriate adjustment of the respective stage vapor compressors.

Advantages of the process include the precipitation of scale-forming compounds employing steam simultaneously for heat and necessary elimination of carbon dioxide, the recovery and re-use of the steam, the avoidance of foreign substances except as alternates, the extreme removal of oxygen and carbon dioxide before evaporation and evaporation itself to an unusually high concentration factor, all of which combine to provide an equable process and a significantly low cost in converting a scale-forming liquid to distillate and liquid residuum.

Having thus described my invention, it will be recognized that adaptations of the method and apparatus may be made that will fall within the terms and scope of the subject matter as claimed.

What I claim is:

1. Method of converting an aqueous scale-forming liquid containing alkaline scale-forming compounds, typified by calcium and magnesium bicarbonates, and non-alkaline scale-forming compounds, typified by calcium sulfate and compounds of silica and iron, which comprises indirectly preheating said aqueous liquid; adding steam to the preheated liquid and condensing the steam therein, whereby the preheated liquid is further heated; as a result of said further heating, thermally decomposing alkaline scale-forming compounds, forming carbon dioxide and a precipitate of alkaline scale compounds and non-alkaline scale compounds; expelling said carbon dioxide from the further heating liquid; separating said precipitate of alkaline and non-alkaline scale compounds from the further heated liquid, thereby forming a hot mother liquor; flash vaporizing the hot mother liquor, forming water vapor and cooled mother liquor; compressing the water vapor and employing compressed vapor as steam for said further heating; and evaporating said cooled mother liquor to form distiallate and aqueous liquid residuum.

2. Claim 1, wherein said aqueous liquid is deaerated.

3. Claim 2, wherein before-mentioned, expelled carbon dioxide is passed to deaerated aqueous liquid, whereby alkaline scale is prevented during said indirect preheating and wherein so-passed, expelled carbon dioxide is subsequently expelled from said further heated liquid.

4. Claim 1, wherein said separated precipitate is added to said aqueous liquid, whereby scale is prevented during said indirect preheating.

5. Claim 1, wherein a nucleating agent, selected from among compounds of iron, and more particularly ferric hydroxide or ferric chloride, is added to said aqueous liquid, whereby scale is prevented during said indirect preheating.

6. Claim 1, wherein said hot mother liquor is flash vaporized in stages, and, passing from stages of higher to lower temperature, issues from the stage of lowest temperature as said cooled mother liquor; the water vapor of each stage is compressed in combination with the successively and multiply compressed vapors from the stages of lesser temperature than said stage; and the vapor issuing from the stage of highest temperature represents said compressed vapor.

7. Claim 1, wherein before its evaporation said cooled mother liquor is further cooled by exchanging heat with said preheating aqueous liquid.

8. Claim 1 wherein said compressed vapor is passed uncondensed through said hot mother liquor before employment of the vapor as said steam, whereby from said hot mother liquor residual oxygen, carbon dioxide and scale-forming compound are eliminated.

9. Claim 8, wherein said compressed vapor is passed uncondensed through said hot mother liquor counterflow to it successively in stages, before employment of the vapor as said steam.

10. Claim 1, wherein the evaporation is carried out in a vapor compression evaporator, in which the vapor formed condenses while indirectly passing the heat of condensation to evaporating liquid; vapor condensate and liquid concentrates are formed, which are cooled to form respectively said distillate and aqueous liquid residuum.

11. Claim 10, wherein said condensate and concentrate are cooled while indirectly passing heat to the before-mentioned cooled mother liquor.

12. Claim 10, wherein the evaporation is carried out in stages of increasing temperature; the condensates of each stage are combined and cooled to form said distillate, and the liquid concentrate from the last stage of highest temperature is cooled to form said aqueous liquid residuum.

13. Claim 1, wherein the evaporation is carried out in a multiple effect evaporator in combination with a vapor compression evaporator, the latter as expressed in claim 10, and the former wherein the vapor of each effect transfers the heat of condensation to the evaporating liquid of a subsequent, lower temperature effect.

14. Claim 1, wherein said precipitate is recirculated to said further heating liquid, whereby said precipitation is nucleated and so accelerated.

15. Claim 1, wherein to said further heating liquid is added a nucleating agent selected from among compounds of iron, and more particularly ferric hydroxide or ferric chloride, whereby said precipitation is accelerated.

16. Claim 1, wherein to said cooled mother liquor is added a nulceating agent selected from among iron compounds, and more particularly ferric hydroxide or ferric chloride, whereby residual alkaline scale is prevented in said evaporation.

17. Claim 1, wherein to said cooler mother liquor is added an acid, whereby residual alkaline scale is prevented in said evaporation.

18. Method of converting an aqueous scale-forming liquid containing scale-forming compounds comprised from among calcium bicarbonates and sulfates and compounds of silica and iron, which comprises indirectly preheating the aqueous scale-forming liquid; adding steam to the preheated liquid and condensing the steam therein, whereby the preheated liquid is further heated; as a result of said further heating, precipitating scale compounds from among said scale-forming compounds; separating said precipitate of scale compounds from the further heated liquid, and forming a hot mother liquor; flash vaporizing said hot mother liquor, forming water vapor and cooled mother liquor; compressing said water vapor and employing said compressed vapor as steam for said further heating; and evaporating said cooled mother liquor to produce distillate and aqueous liquid residuum.

* * * * *